(12) United States Patent
Baer

(10) Patent No.: US 8,455,080 B2
(45) Date of Patent: Jun. 4, 2013

(54) SELF-ADHESIVE PROTECTIVE SUBSTRATE

(75) Inventor: Angela L. Baer, Westminster, MD (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 1642 days.

(21) Appl. No.: 11/617,686

(22) Filed: Dec. 28, 2006

(65) Prior Publication Data

US 2007/0154684 A1 Jul. 5, 2007

Related U.S. Application Data

(60) Provisional application No. 60/755,583, filed on Dec. 30, 2005.

(51) Int. Cl.
*B32B 3/00* (2006.01)

(52) U.S. Cl.
USPC .......... 428/77; 428/36.1; 428/36.3; 428/40.1; 428/189; 428/190

(58) Field of Classification Search
USPC ............. 428/77, 40.1, 36.1, 36.3, 190, 189
See application file for complete search history.

(56) References Cited

U.S. PATENT DOCUMENTS

| | | | |
|---|---|---|---|
| 2,941,570 A | 6/1960 | Plym | |
| 3,692,924 A | 9/1972 | Nye | |
| 4,018,962 A | 4/1977 | Pedlow | |
| 4,022,248 A | 5/1977 | Hepner et al. | |
| 4,265,953 A | 5/1981 | Close | |
| 4,284,842 A | 8/1981 | Arroyo et al. | |
| 4,319,940 A | 3/1982 | Arroyo et al. | |
| 4,417,603 A | 11/1983 | Argy | |
| 4,421,807 A | 12/1983 | Clausing et al. | |
| 4,510,348 A | 4/1985 | Arroyo et al. | |
| 4,532,168 A | 7/1985 | Steele et al. | |
| 4,606,957 A | 8/1986 | Cohen | |
| 4,640,032 A | 2/1987 | Lewis | |
| 4,772,507 A | 9/1988 | Leo, Jr. et al. | |
| 4,778,700 A | 10/1988 | Pereira | |
| 4,859,534 A | 8/1989 | Van Niekerk | |
| 4,900,383 A | 2/1990 | Dursch et al. | |
| 4,906,427 A | 3/1990 | Van Loo et al. | |
| 4,939,317 A | 7/1990 | Hostler | |
| 5,021,611 A | 6/1991 | Amano | |
| 5,069,969 A | 12/1991 | McClintock et al. | |
| 5,077,106 A | 12/1991 | Dursch et al. | |
| 5,134,000 A | 7/1992 | Smythe et al. | |
| 5,364,693 A * | 11/1994 | Moren et al. .................. | 442/164 |

(Continued)

FOREIGN PATENT DOCUMENTS

DE 295 10 907 U1 10/1995

*Primary Examiner* — Brent O'Hern
(74) *Attorney, Agent, or Firm* — Dickinson Wrights, PLLC; Robert L. Stearns

(57) ABSTRACT

A protective sleeve for covering a wire harness. The protective sleeve includes an outer layer of a woven fabric extending a first length and a first width and having inwardly-facing surface and outwardly-facing surface. The protective sleeve also includes an adhesive layer applied over the inner-facing surface of the outer layer. The protective sleeve also includes an inner layer of non-woven fabric extending a second length and a second width less than the first width. The inner layer has an outwardly-facing surface adhered to the adhesive layer. The inner layer is centered on the outer layer such that two portions of the adhesive layer extend exposed along the first length on opposite sides of the second width.

8 Claims, 2 Drawing Sheets

U.S. PATENT DOCUMENTS

| | | |
|---|---|---|
| 5,411,777 A | 5/1995 | Steele et al. |
| 5,435,667 A | 7/1995 | Strange |
| 5,593,756 A | 1/1997 | Miller |
| 6,309,721 B1 * | 10/2001 | Gladfelter et al. ........... 428/36.1 |
| 6,341,626 B1 | 1/2002 | Davenport et al. |
| 6,433,273 B1 | 8/2002 | Kenyon et al. |
| 6,935,379 B1 | 8/2005 | Buchanan, Sr. |
| 2002/0053392 A1 | 5/2002 | Lodde |
| 2002/0098311 A1 * | 7/2002 | Lindner ...................... 428/40.1 |
| 2002/0125037 A1 | 9/2002 | Kulper et al. |
| 2003/0211263 A1 * | 11/2003 | Dermody et al. ........... 428/36.3 |
| 2005/0199412 A1 | 9/2005 | Ke et al. |

* cited by examiner

US 8,455,080 B2

SELF-ADHESIVE PROTECTIVE SUBSTRATE

CROSS-REFERENCE TO RELATED APPLICATIONS

This application claims the benefit of U.S. Provisional Patent Application Ser. No. 60/755,583 for a SELF-ADHESIVE PROTECTIVE SUBSTRATE, filed on Dec. 30, 2005, which is hereby incorporated by reference in its entirety.

BACKGROUND OF THE INVENTION

1. Field of the Invention

This invention concerns sleeving for protecting elongated items.

2. Description of Related Art

Elongated items, such as wiring harnesses and optical fiber bundles, are often used in automotive, aerospace and marine environments where they are subjected to significant vibration. In automotive applications, wiring harnesses in particular are pernicious sources of unwanted "rattle noise" due to their propensity to resonate in response to structure borne vibration caused by engine operation or irregularities of the road surface over which the vehicle is passing. Wiring harnesses typically extend substantially throughout the vehicle's passenger compartment where they distribute power and control signals from the engine compartment to the dashboard instruments, interior lights, radio, speakers, electric windows, electric door locks, the window defogging element and on to the trunk to power the tail lights and often an electric fuel pump which may be positioned in the fuel tank. Although the harness is intermittently attached to the vehicle structure, the lengths of the harness between attachment points will often resonate and rattle against the structure in response to relatively low-frequency vibrations within the range of human hearing and provide a source of noise, which is both annoying and a cause of concern to the vehicle occupants. Aside from the noise annoyance, vibration of wiring harnesses will cause fatigue failures of the wiring, solder joints or mechanical connectors, leading to electrical malfunctions such as short circuits which could result in a vehicle fire.

Wiring harnesses are often wrapped with adhesive tape to protect and bundle them securely together. However, this process is labor intensive and consumes significant quantities of tape beyond what is reasonably necessary to protect the harness. Excessive tape consumption results from the taping process being a hand operation which is not executed with precision or reproduced reliably.

SUMMARY OF THE INVENTION

A protective sleeve for covering a wire harness. The protective sleeve includes an outer layer of a woven fabric extending a first length and a first width and having inwardly-facing surface and outwardly-facing surface. The protective sleeve also includes an adhesive layer applied over the inner-facing surface of the outer layer. The protective sleeve also includes an inner layer of non-woven fabric extending a second length and a second width less than the first width. The inner layer has an outwardly-facing surface adhered to the adhesive layer. The inner layer is centered on the outer layer such that two portions of the adhesive layer extend exposed along the first length on opposite sides of the second width.

BRIEF DESCRIPTION OF THE DRAWINGS

Advantages of the present invention will become more readily appreciated when considered in connection with the following detailed description and appended drawings, wherein.

DETAILED DESCRIPTION OF THE EXEMPLARY EMBODIMENT

The invention concerns a sleeve for surrounding and protecting an elongated item. The sleeve comprises a flexible first substrate having a surface and first and second edges oppositely disposed. An adhesive layer is positioned on the surface. A flexible second substrate is attached to the surface by the adhesive layer. The second substrate has a first edge positioned in spaced relation to the first edge of the first substrate, and a second edge positioned in spaced relation to the second edge of the first substrate thereby defining first and second adhesive regions exposed on the surface. The first adhesive region is adhesively attachable to the elongated item. The first substrate is wrapable around the elongated item, and the second adhesive region is attachable to the first substrate thereby closing the sleeve.

In one embodiment, the first substrate comprises a woven fabric and the second substrate comprises a non-woven fabric.

A kit is also provided for wrapping an elongated item with a protective sleeve. The kit comprises a sleeve as described above and a container adapted to hold the sleeve, the container being air tight for preserving the adhesive regions exposed on the surface of the first substrate.

Figure 1:
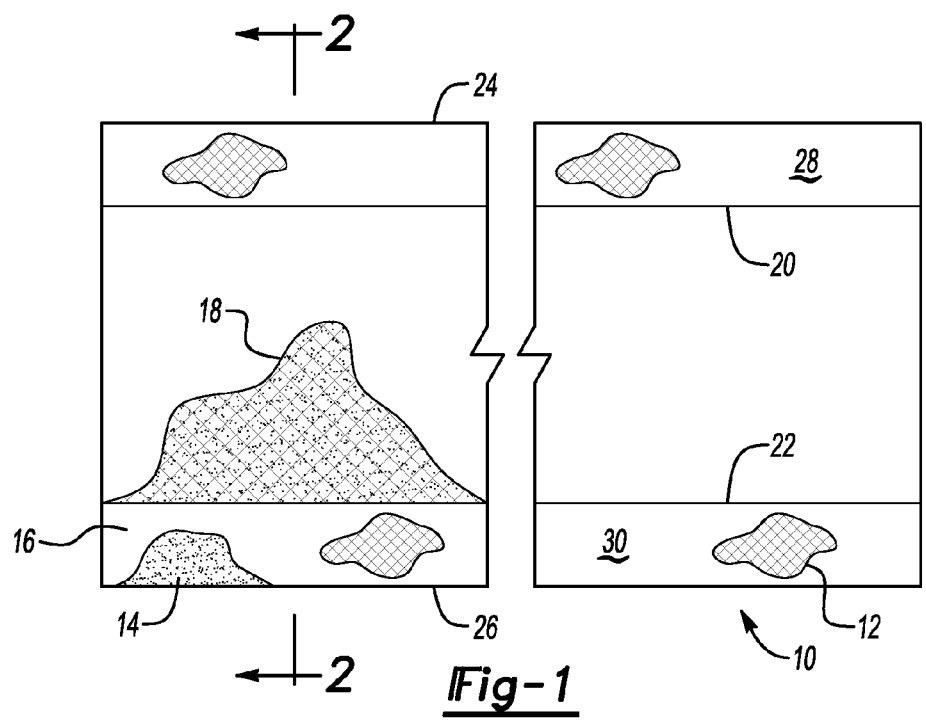
FIG. 1 is a plan view of a sleeve according to the invention.
Figure 3:
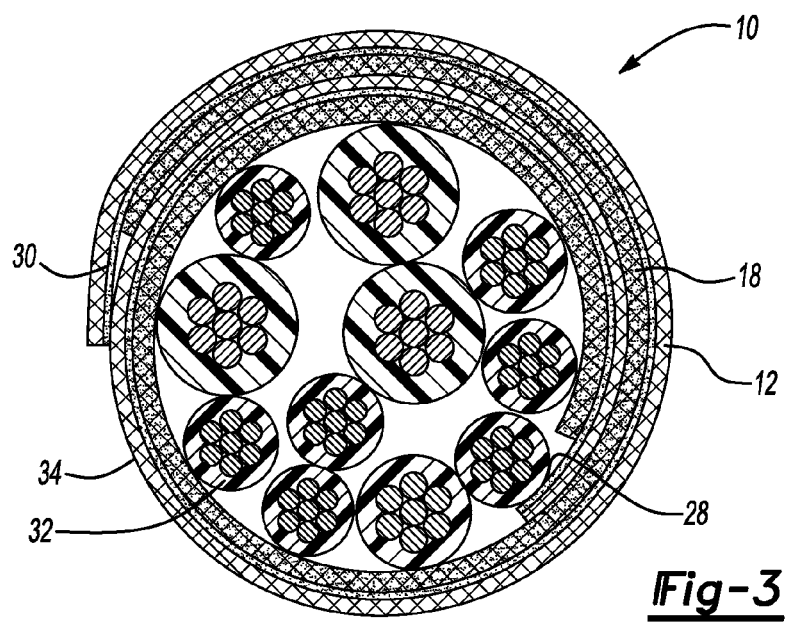
FIGS. 3 and 4 are cross-sectional views of the 30 sleeve shown in FIG. 1 wrapped around elongated items.
Figure 4:
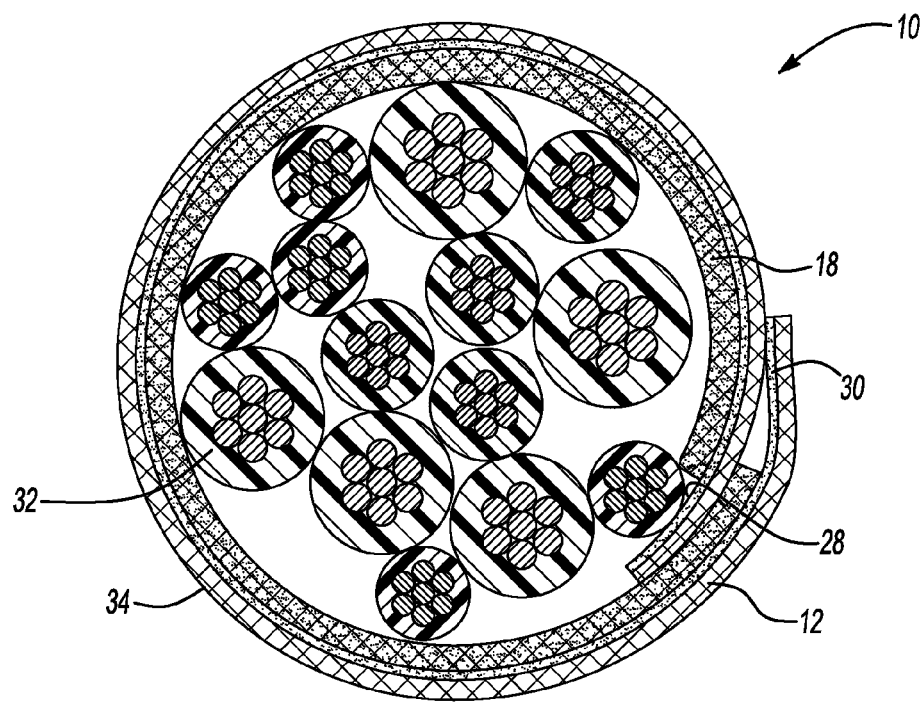

FIG. 1 shows a sleeve 10 according to the invention. Sleeve 10 comprises a flexible base substrate 12, preferably a woven fabric. Base substrate 12 is of indeterminate length and has a width sized to accommodate a range of diameters of elongated items as shown in FIGS. 3 and 4. A width of about 88 mm has been found practical as it provides for a sleeve that is easy to handle and readily positionable about a wide variety of wiring harnesses, the sleeve completely covering the larger diameter harnesses (FIG. 4) while also covering the smaller diameter harnesses (FIG. 3) with an acceptable degree of overlap indicative of excess material. The width may of course be tailored to suit a particular need, and the invention is not limited to any particular width of substrate.

Figure 2:
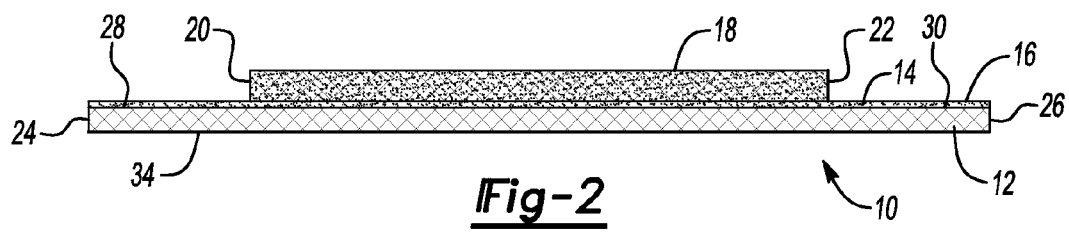
FIG. 2 is a cross-sectional view taken at line 2-2 of FIG. 1.

An adhesive layer 14 is positioned on a surface 16 of the base substrate, the adhesive preferably covering the entire surface. As shown in FIGS. 1 and 2, a damping substrate 18 is attached to the surface 16 via the adhesive layer 14. Damping substrate 18 is preferably formed of a non-woven fabric, such as a felt, and extends along the entire length of the base substrate 12. The width of the damping substrate 18 is sized so that it completely encircles the harness with at least one revolution of circumferential protection. Damping substrate 18 has oppositely disposed edges 20 and 22 that are positioned in spaced relation from the oppositely disposed edges 24 and 26 of the base substrate 12. The relative positioning of the edges defines regions 28 and 30 on the base substrate 12 where the adhesive layer 14 is exposed. For the 88 mm wide base substrate it is found practical to make the exposed adhesive regions 28 and 30 each about 11 mm-15 mm wide. Other widths are of course feasible.

The base substrate 12 may be formed of woven polyester yarns and the damping substrate 18 may be formed of polyester felt. Materials having high flame test ratings are advantageous because they allow the sleeve 10 to be used within the passenger compartment as well as within the engine compartment with little risk of fire propagation via the sleeve 10. The adhesive 14 can be a pressure sensitive adhesive for ease of installation as described below. The adhesive can also be fire retardant to allow the sleeve 10 to be applied in relatively extreme operating environments.

In use, as shown in FIGS. 3 and 4, the sleeve 10 is positioned longitudinally alongside an elongated item, such as a wiring harness 32, to be covered. One of the adhesive regions 28 is pressed against the harness 32 to secure the sleeve 10 to the harness 32. The sleeve 10 is then "cigarette" wrapped around the harness 32 with the damping substrate 18 facing inwardly to lie against the harness 32. The opposite adhesive region 30 is then pressed against the outwardly facing surface 34 of the base substrate 12 closing the sleeve 10 and protecting the harness 32. The damping substrate 18 provides cushioning to absorb vibrational energy and reduce rattle noise and mitigate cumulative fatigue damage.

Pressure sensitive adhesive is advantageous because it allows the sleeve 10 to be applied easily as described above merely by pressing the exposed adhesive regions 28, 30 against an opposing surface, be it the harness 32 or the outwardly facing surface 34 of the sleeve 10 itself.

Figure 5:
FIG. 5 is a schematic sectional view of a kit for wrapping elongated items with a sleeve according to 35 the invention.

It is preferred to avoid the use of release paper to protect the adhesive 14 until the sleeve 10 is applied to the item. Eliminating the release paper saves on material costs and effort in applying the sleeve 10. However, the adhesive 14 exposed on the regions 28, 30 of the base substrate 12 must be protected and not permitted to dry out or accumulate dust and debris which may cause it to lose its adhesive quality. To this end a kit 36 is provided as shown in FIG. 5. The kit 36 comprises a spool 38 around which the sleeve 10 is wound, the spool 38 being positioned within an air-tight container 40. The sleeve 10 may be dispensed from the container 40 as needed and stored therein to preserve the adhesive 14 for future use.

Protective sleeves according to the invention provide a low cost, reliable product that is easy to install and gives protection to wiring harnesses and other elongated items.

Many modifications and variations of the present invention are possible in light of the above teachings. It is, therefore, to be understood that within the scope of the appended claims, the invention may be practiced otherwise than as specifically described.

What is claimed is:

1. An elongate protective sleeve extending along a longitudinal axis for covering an elongate wire harness comprising:
    an outer layer of a woven fabric extending a first length along said longitudinal axis and extending a first width transverse to said longitudinal axis between first opposite edges, said outer layer having an inwardly-facing surface and outwardly-facing surface;
    an adhesive layer applied over said inwardly-facing surface of said outer layer; and
    an inner layer of non-woven fabric extending a second length along said longitudinal axis and extending a second width transverse to said longitudinal axis between second opposite edges, said second width being less than said first width, said inner layer having an outwardly-facing surface adhered to said adhesive layer wherein said inner layer is centered widthwise on said outer layer such that said second opposite edges are spaced substantially equally from said first opposite edges to provide two portions of said adhesive layer that extend exposed between said first and second opposite edges and extend along said first length on opposite sides of said second opposite edges.

2. The protective sleeve of claim 1 wherein said outer and inner layers are further defined as being flame resistant.

3. The protective sleeve of claim 1 wherein said inner layer is further defined as felt.

4. The protective sleeve of claim 1 wherein said adhesive layer is further defined as pressure sensitive adhesive.

5. The protective sleeve of claim 1 wherein said adhesive layer is further defined as fire retardant.

6. The protective sleeve of claim 1 wherein said outer layer is further defined as being formed from polyester yarn.

7. A kit for a protective sleeve extending along a longitudinal axis of an elongated item and comprising:
    an outer layer of a woven fabric extending a first length along said longitudinal axis and extending a first width transverse to said longitudinal axis between first opposite edges, said outer layer having an inwardly-facing surface and outwardly-facing surface;
    an adhesive layer applied over said inwardly-facing surface of said outer layer;
    an inner layer of non-woven fabric extending a second length along said longitudinal axis and extending a second width transverse to said longitudinal axis between second opposite edges, said second width being less than said first width, said inner layer having an outwardly-facing surface adhered to said adhesive layer wherein said inner layer is centered widthwise on said outer layer such that said second opposite edges are spaced substantially equally from said first opposite edges to provide two portions of said adhesive layer that extend exposed between said first and second opposite edges and extend along said first length on opposite sides of said second opposite edges; and
    an air-tight container adapted to hold said outer and inner layers being connected to one another with said adhesive layer for protecting said adhesive layer.

8. The kit of claim 7 further comprising:
    a spool disposed in said air-tight container, wherein said outer and inner layers being connected to one another with said adhesive layer are wound around said spool.

* * * * *